US006866226B2

United States Patent
Pratt et al.

(10) Patent No.: US 6,866,226 B2
(45) Date of Patent: Mar. 15, 2005

(54) PRESSURE RESPONSIVE BLOWOUT LATCH

(75) Inventors: John D. Pratt, Laguna Niguel, CA (US); Timothy S. Rozema, Ladera Ranch, CA (US); Frank T. Jackson, Sr., Lake Elsinore, CA (US); William Bourne, Redondo Beach, CA (US); Manuel Andres Hernandez, Temecula, CA (US)

(73) Assignee: Hartwell Corporation, Placentia, CA (US)

( * ) Notice: Subject to any disclaimer, the term of this patent is extended or adjusted under 35 U.S.C. 154(b) by 175 days.

(21) Appl. No.: 10/138,283

(22) Filed: May 3, 2002

(65) Prior Publication Data

US 2003/0066930 A1 Apr. 10, 2003

Related U.S. Application Data

(60) Provisional application No. 60/326,942, filed on Oct. 4, 2001.

(51) Int. Cl.[7] .............................................. E05B 65/10
(52) U.S. Cl. ................. 244/129.4; 244/129.5; 292/21; 292/92; 292/93; 292/254; 49/503
(58) Field of Search .......................... 244/129.4, 129.5, 244/129.1; 292/21, 92, 93, 254; 49/503

(56) References Cited

U.S. PATENT DOCUMENTS

| 1,950,843 A | 3/1934 | Fischer ........................ 189/45 |
| 2,156,387 A | 5/1939 | Goldfinger ................... 292/144 |
| 2,606,052 A | 8/1952 | Soreng et al. .............. 292/144 |
| 2,774,116 A | 12/1956 | Wolverton |
| 3,426,694 A | 2/1969 | Marsh ......................... 103/125 |
| 3,453,777 A | 7/1969 | Reilly ......................... 49/141 |
| 3,571,977 A | 3/1971 | Abeel et al. .................. 49/379 |
| 3,638,984 A | 2/1972 | Davidson ............... 292/341.16 |

(List continued on next page.)

Primary Examiner—J. Woodrow Eldred
(74) Attorney, Agent, or Firm—Barnes & Thornburg LLP

(57) ABSTRACT

An apparatus, system and method including a latching device for displaceably retaining a panel relative to a frame. The latching device includes at least a bolt which is carried on the latching device and is operatively associated with the panel to prevent disengagement of the panel. The latching device includes at least one pressure responsive device operatively coupled to the bolt to retain the bolt in a desired position and release the bolt when a predetermined pressure differential occurs relative to two, generally opposite, sides of the panel or when a pressure decrease occurs on one side of the panel.

40 Claims, 6 Drawing Sheets

U.S. PATENT DOCUMENTS

| | | | |
|---|---|---|---|
| 3,704,845 A | 12/1972 | Ord | 244/121 |
| 3,738,681 A | 6/1973 | Wada et al. | 280/150 AB |
| 3,753,316 A | 8/1973 | Savarieau et al. | 49/31 |
| 3,861,727 A | 1/1975 | Froerup et al. | 292/341.16 |
| 3,938,764 A | 2/1976 | McIntyre et al. | 244/117 R |
| 3,981,302 A * | 9/1976 | Veit | 128/202.26 |
| 4,042,193 A | 8/1977 | Cerne | 244/129.1 |
| 4,048,756 A | 9/1977 | Lawrence | 49/171 |
| 4,126,341 A | 11/1978 | Bradstock | 292/201 |
| 4,230,352 A | 10/1980 | Sealey et al. | 292/341.17 |
| 4,383,666 A | 5/1983 | Allerding et al. | 244/118.5 |
| 4,390,152 A | 6/1983 | Jorgensen | 244/118.5 |
| 4,432,514 A | 2/1984 | Brandon | 244/118.5 |
| 4,522,359 A | 6/1985 | Church et al. | 244/129.5 |
| 4,543,889 A | 10/1985 | Fritz | 105/377 |
| 4,552,326 A | 11/1985 | Bokalot | 244/129.5 |
| 4,575,136 A | 3/1986 | Keller | 292/33 |
| 4,681,286 A | 7/1987 | Church et al. | 244/129.5 |
| RE32,554 E | 12/1987 | Murphy | 244/118.5 |
| 4,720,065 A | 1/1988 | Hamatani | 244/129.5 |
| 4,756,566 A | 7/1988 | Logas | 292/341.16 |
| 4,915,326 A | 4/1990 | Plude | 244/129.5 |
| 4,917,425 A | 4/1990 | Logas | 292/341.16 |
| 4,986,584 A | 1/1991 | Logas | 292/314.16 |
| 5,046,686 A | 9/1991 | Carla et al. | 244/118.5 |
| 5,118,053 A | 6/1992 | Singh et al. | 244/118.5 |
| 5,118,150 A | 6/1992 | Jarrett | 292/314.16 |
| 5,163,639 A | 11/1992 | Herrmann et al. | 244/129.5 |
| 5,251,851 A | 10/1993 | Herrmann et al. | 244/129.5 |
| 5,275,361 A | 1/1994 | Fray | 244/129.1 |
| 5,289,615 A | 3/1994 | Banks et al. | 16/366 |
| 5,305,969 A | 4/1994 | Odell et al. | 244/129.5 |
| 5,337,977 A | 8/1994 | Fleming et al. | 244/129.5 |
| 5,379,971 A | 1/1995 | Kim et al. | 244/129.5 |
| 5,480,109 A | 1/1996 | Klein et al. | 244/129.5 |
| 5,490,699 A | 2/1996 | Uyeda | 292/341.16 |
| 5,535,804 A | 7/1996 | Guest | 160/180 |
| 5,577,781 A | 11/1996 | Kallies et al. | 292/195 |
| 5,667,169 A | 9/1997 | Erben et al. | 244/129.5 |
| 5,765,883 A | 6/1998 | Dessenberger et al. | 292/97 |
| 5,782,511 A | 7/1998 | Schwarz | 292/219 |
| 5,823,473 A | 10/1998 | Odell et al. | 244/129.5 |
| 5,879,034 A | 3/1999 | Johns | 292/195 |
| 6,106,032 A * | 8/2000 | Och | 292/207 |
| 6,116,542 A | 9/2000 | Erben | 244/129.5 |
| 6,168,114 B1 | 1/2001 | Erben | 244/129.5 |
| 6,484,449 B1 | 11/2002 | Artsiely | 49/506 |
| 6,669,144 B2 | 12/2003 | Artsiely | |
| 2002/0092951 A1 | 7/2002 | Pratt et al. | 244/118.5 |
| 2003/0052227 A1 * | 3/2003 | Pittman | 244/118.5 |

* cited by examiner

PRESSURE RESPONSIVE BLOWOUT LATCH

CROSS REFERENCE

This application claims priority under 35 U.S.C. 119(e) to U.S. Provisional Application Ser. No. 60/326,942 filed Oct. 4, 2001 which is expressly incorporated herein by reference.

BACKGROUND

The present disclosure relates to an apparatus, system and method for a latching device which operates in response to a pressure differential between a first side and a second side of a barrier to allow a panel associated with the barrier to release upon a given set or range of pressure conditions.

SUMMARY

By way of review, a variety of latching devices have been developed to maintain panels, doors and other structures in a closed position. The reference to panels, doors and other structures relates to the use of latching devices to retain a first body, such as a panel relative to a second body, such as a frame. With regard to the example of panels, a panel includes one portion which might be rotatably hinged or otherwise movably retained on a corresponding structure such as a frame. The panel serves to close or cover at least a portion of an opening defined by the frame for a variety of purposes including providing a barrier to prevent passage through the opening.

A variety of latching devices have been developed to facilitate the movement or "blowout" of a panel relative to the frame. Such blowout latching devices have been developed by Hartwell Corporation, assignee of the present disclosure to facilitate disengagement of a panel from a frame or other structure under a set or range of "blowout" conditions. For example, if a pressure differential develops on opposite sides of a barrier or within an area at least partially housed or contained by the panel, the pressure differential will rise to a point where the panel may be forcibly removed, disengaged or "blown out" from the frame by forces associated with the pressure differential. Under these conditions, it is desirable to set the blowout force at a desired level or range so that premature disengagement of the panel from the primary structure does not occur. In this situation, the blow out load level can be set so that a predetermined pressure differential disengages the panel from the primary structure to protect and preserve the integrity of the frame and any related structures and devices.

In some situations, it would be desirable to maintain a panel in a closed position under one level or range of pressure conditions yet release the panel under a second range or set of conditions. Such level or range may or may not overlap or may be discrete ranges or, in fact, points. The panel in such a situation generally is in an environment where the pressure on either side of the panel is generally equalized. The panel may include a sealing structure to prevent the unwanted or abrupt passage of air there through. However, the pressure on either side of the panel is generally equal.

One example of the use of such a panel in a well-known environment is the use of a panel in a pressurized cabin such as in an aircraft. The panel is employed as a barrier to separate the flight crew, passengers and/or cargo into discrete areas. Such a panel may be used between the flight deck and passenger compartment as well as perhaps between the passenger compartment and corresponding storage area which is not occupied by passengers. In the situation in which the panel is used on an aircraft in which the cabin is pressurized, it may be desirable to maintain the panel in a closed position for many situations but allow the panel to be opened when the pressure differential between the two compartments changes. Such a pressure differential may occur in the case where cabin pressure drops in the cargo compartment due to a leak or other loss of pressure. Under these circumstances, it might be desirable to allow the cabin pressure to generally equalize to avoid or minimize damage which might result from the pressure differential.

Similarly, in a situation where a panel is positioned between the flight deck and the passengers, it may be desirable to release the panel and equalize the pressure between the flight deck and passenger area. In the situation in which the panel is positioned between the flight deck and passenger area, it might be desirable to allow the panel to disengage, rather than having the door structurally fail as a result of the unequal pressure differentials, rather than having the door structurally fail.

For example, the panel to the flight deck generally is maintained in a closed and latched position while in flight to maintain privacy of the flight crew. This prevents the passage of passengers into the flight deck area. Increased latching strength is required in order to prevent a passenger from forcibly opening the panel. However, in a situation in which pressure is lost in the passenger compartment, it may be desirable to allow the panel to release in order to prevent the panel from being forcibly removed from the structure by the pressure differential. This would help prevent injury to passengers if the panel were forcibly removed from the frame and expelled into the passenger compartment. By allowing the panel to release in response to the pressure differential between the flight deck and passenger compartment, the panel will open thereby providing increased safety. Similarly, if the pressure differential occurs as a result of loss of pressure in the flight deck, the panel will be allowed to disengage the frame, yet be retained thereon, to provide pressure equalization to prevent injury to the flight crew and equipment.

With the foregoing in mind, it would be desirable to provide a method, system and apparatus to provide unlatching of the door latch under a range or set of pressure differential circumstances. The present disclosure seeks to provide an improved, novel latching device which operates in response to a pressure differential.

BRIEF DESCRIPTION OF THE DRAWINGS

The detailed description particularly refers to the accompanying figures in which.

DESCRIPTION OF THE DRAWINGS

Figure 1:
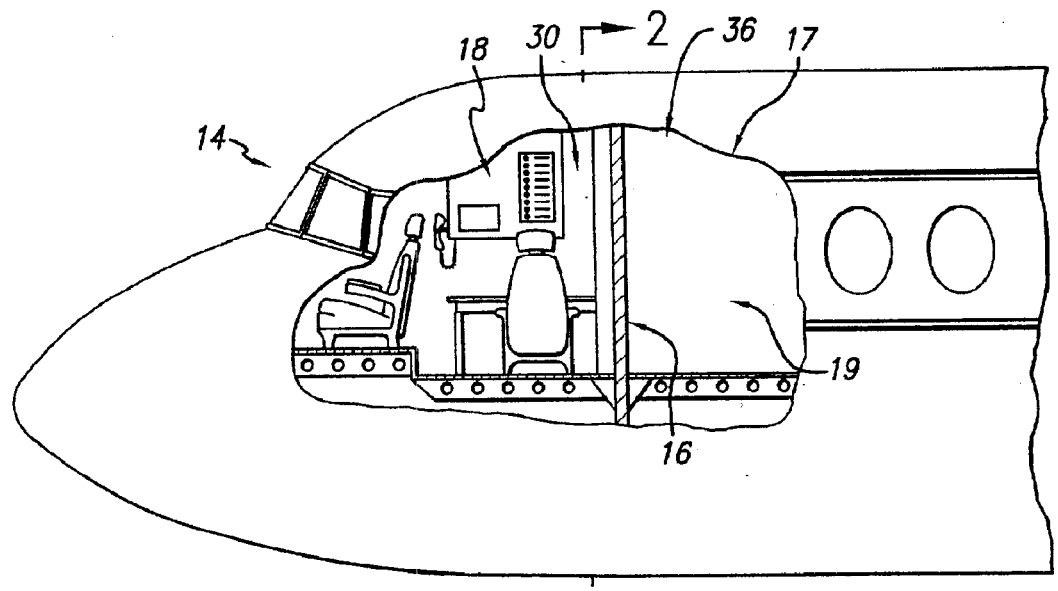
FIG. 1 is a partial fragmentary view of a portion of an aircraft having a barrier which is positioned between a cockpit area and a passenger area.

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

FIG. 1 shows a fragment of a front section of an aircraft 14 in which a portion of the outside of the aircraft 14 has been broken away to illustrate a barrier 16. The barrier 16 divides an internal compartment 17 to separate a flight deck or cockpit area 18 from a passenger area 19. As it will be described in detail herein below, the present disclosure helps to prevent unpermitted access from the passenger compartment 19 to the cockpit 18. Also, the disclosure allows automatic opening of the barrier 16 in the event of depressurization in either the cockpit 18 or passenger compartment 19.

Figure 2:
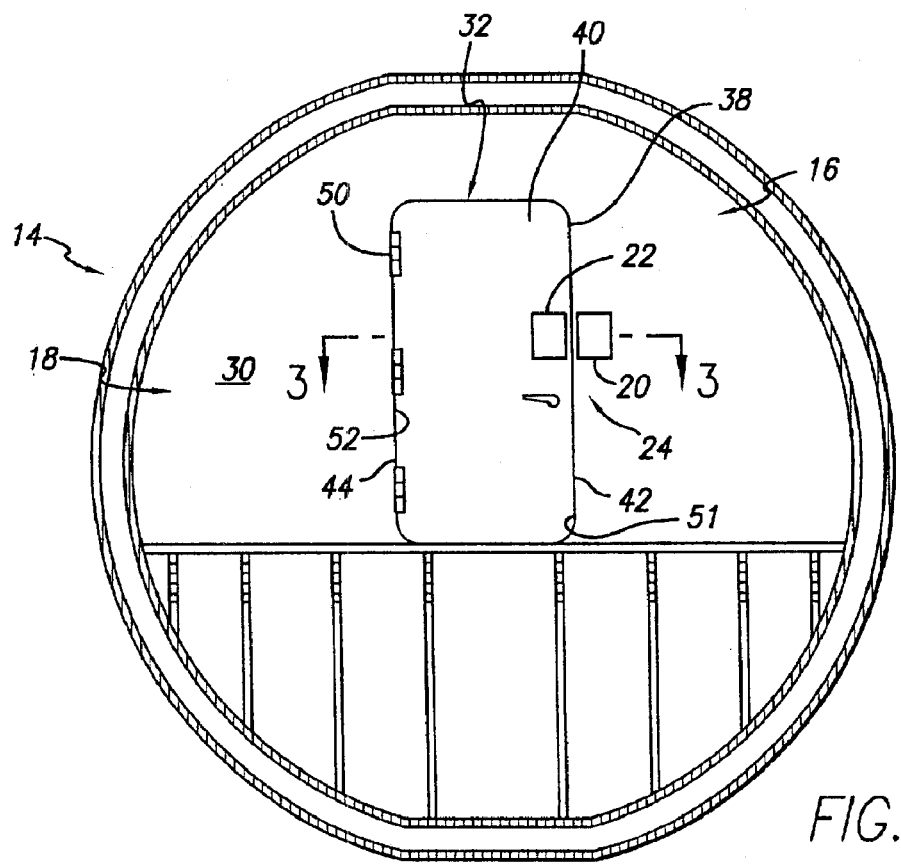
FIG. 2 is a diagrammatic cross-sectional view taken along line 2—2 in FIG. 1 showing a panel in the barrier employing a latching device as disclosed.

FIG. 2 provides a general diagrammatic illustration taken along line 2—2 in FIG. 1 showing a view from the cockpit area 18 facing the barrier 16. As shown generally in FIG. 2, the disclosure includes a first portion 20 and a second portion 22 comprising the latching mechanism 24. In the embodiment shown, the first portion 20 includes a pressure responsive device 26 (FIGS. 3–5) which includes a passage 28 communicating with a volume and associated pressure on a first side 30 (cockpit 18) of a panel assembly 32 and a passage 34 communicating with a volume and associated pressure on a second side 36 (passenger compartment 19) of the panel assembly 32.

The door or panel assembly 32 includes a frame structure 38 and a panel 40. The panel 40 includes a free end 42 and a movably retained end 44. As indicated by the arrows 46, 48, the panel 40 can swing towards the first side 30, the second side 36, or swing between both sides 30, 36. The movement of the panel 40 depends upon the retaining structure 50, such as a hinge structure, which attaches the retained end 44 to a second portion 51 of the frame structure 52. In summary, the free end 42 of the door panel 40 moves relative to the retained end 44 by way of the retaining means 52 to move the panel relative to the second portion 51 of the frame structure 52.

The first and second portions 20, 22 are attached to respective, generally proximate areas on the panel 40 and frame 38. The portions, 20, 22 make up the latching device 24. As will be described in greater detail herein below, the latching device 24 includes a mechanism which selectively engages the portions 20, 22 to providing a resistance force which resists separation of the panel 40 from the corresponding frame 38. In this regard, the panel 40 is retained or locked in position until other pressure related conditions are met. The retaining force is generally illustrated as a mechanical arrangement whereby one mechanism engages a corresponding area to prevent dislodgement of the panel 40 from the frame 38. It is also envisioned the portions 20, 22 making up the latching mechanism 24 may also have a magnetic force such that the magnetic force resists displacement of the door panel 40 relative to the frame 38. As shown in the embodiment of FIGS. 6–13 the mechanism includes a bolt 78 which engages a corresponding second portion the frame 38 of prevent disengagement of the panel 40 from the frame 38.

Figure 5:
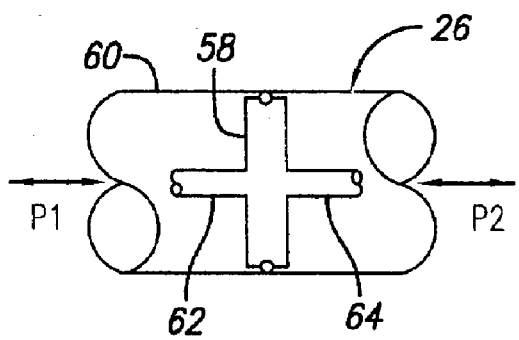
FIG. 5 is an enlarged diagrammatic illustration of a pressure responsive device as employed in the present disclosure.

The device, whether it is mechanical or magnetic is acted on, responsive to, and/or affected or controlled by the pressure detected by or acting on the pressure responsive device 26. The pressure responsive device 26 is embodied in one form as shown in FIG. 5 as a pressure cylinder or pneumatic piston which moves a plunger 58 through the cylinder structure 60. Engaging structures 62, 64 are associated with the latching device 24 to either engage or disengage the corresponding portion 22. The engaging structures 62, 64 are attached to appropriate structures such that when the plunger 58 is moved, the latching device 24 will either engage or disengage to facilitate locking or unlocking of the latching device 24. Further details as to the mechanical latching structures retained in the latching device 24 are provided herein below. Further, the pressure responsive device may be in the form of a diaphragm which is coupled to the latching device 24.

Another form of the pressure responsive device 26 is generally responsive to pressure on one side of the device. In this regard, this form of the device 26 may or may not communicate with both sides of the panel. In this embodiment, a dramatic, sudden change in pressure will cause a rapid shift in the output of the output of the pressure responsive device 26 causing the desired pressure responsive effect on the latching mechanism. Such a change in pressure is generally so large on one side of the panel that the pressure change on the other side of the panel is negligible. Such a pressure change might occur rapid in a decompression event.

Figure 3:
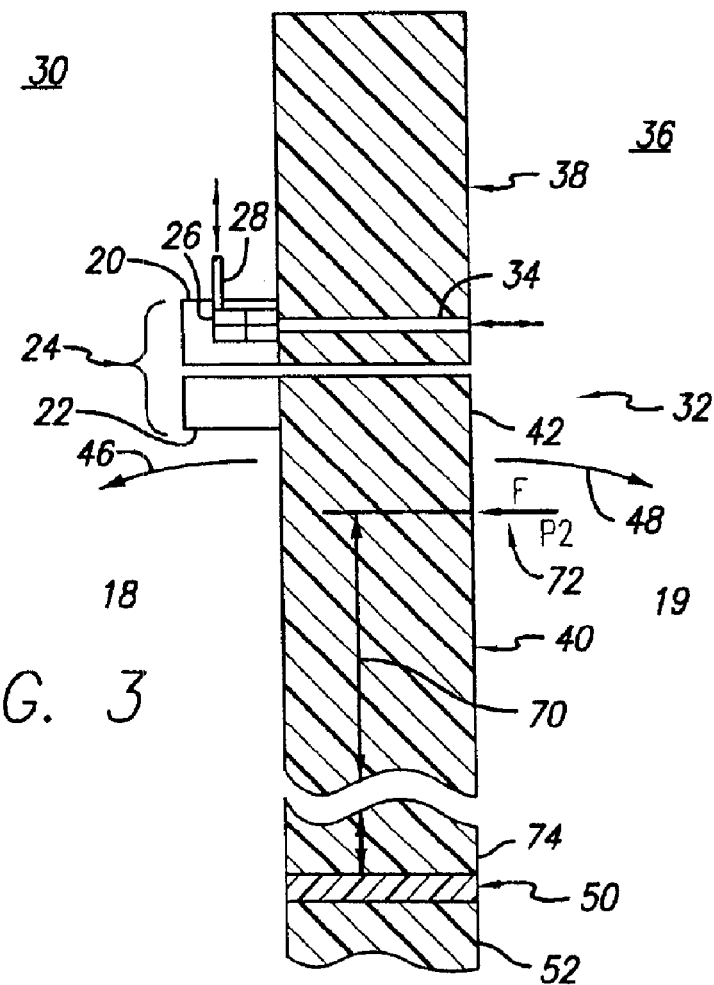
FIG. 3 is a diagrammatic cross-sectional view taken along line 3—3 in FIG. 2.
Figure 4:
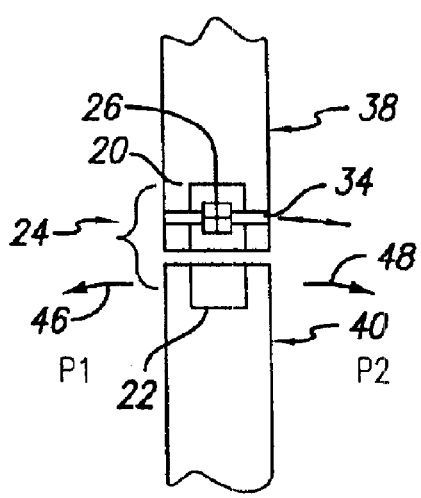
FIG. 4 is a cross-sectional view similar to that as shown in FIG. 3 showing an embodiment of the latching device.

FIG. 4 shows an embodiment in which the latching device 24 is integrated into the panel and the panel 40 and frame 38 structures. With reference to FIGS. 2 and 3, the first and second components 20, 22 are attached to a corresponding first surface 30. This allows the latching device 24 to be attached to any corresponding surfaces as well as allowing the latching device 24 to be retrofitted to a door assembly 32. The embodiment as shown in FIG. 4 allows the latching device 24 to be integrated into the design and construction of the panel assembly. The embodiment as shown in FIG. 4 employs the same general principles of the method, system and apparatus as disclosed and discussed with regard to FIGS. 1–3.

It should also be noted that the first and second portions 20, 22 may be reversed relative to the panel 40 and frame 38. In this regard, for example, the first structure 20 as shown in FIG. 3 on the frame 38 could be attached to the panel 40 and the structure 22 attached to the panel 40 could be attached to the frame 38. Regardless of the position of the portions, 20, 22, the general method and function of the latching device 24 will remain the same. In this regard, the objective of the latching device 24 is to retain the panel 40 in a closed position relative to the frame 38 under the general circumstances in which the pressure identified as P1 on the first side 30 of the door is generally equal to the pressure P2 on the second side 36 of the panel. It is expected that a range of equivalent pressure differentials would be permitted to allow some degree of variation in pressure differential between the first side 30 and the second side 36. However, the range would be defined to provide some practical limit whereby the latching device 24 would eventually allow disengagement of the first and second portions 20, 22 to allow the panel 40 to be displaced relative to the frame 38.

For example, if the pressure on the first side 30 is decreased relative to the second side 36 such that P1 is less than P2 and the pressure differential or the difference between P1 and P2 is substantial enough based on the criteria established for the system to justify disengagement of the first and second portions 20, 22, the first and second portions will disengage. Disengagement of the portions will result in opening or disengagement of the panel 40 relative to the frame 38. For example, if P1 is the pressure in a flight deck area and P2 is the pressure in a passenger compartment, a change in the pressures or pressure differential relative to either side of the panel 40 creates a force on one side of the panel. For example, if the pressure in the passenger compartment 19, P2, is reduced a force will be imposed on the panel 40 drawing the panel 40 towards the passenger compartment 19. The latching device 24 resists disengagement of the panel 20 from the frame 38 and as such the panel 40 will not open. However, by operation of the pressure responsive device 26, the mechanism which cooperates with the pressure responsive device 26 will become disengaged allowing the panel 40 to move relative to the frame 38. This operation of the latching device 24 allows the panel 40 to remain closed and latched to prevent unintended, forced or accidental entry, access to or displacement of the panel yet allows the panel to become displaced as a result of disengaging the latching device 24 in response to a pressure differential. This prevents the panel 40 or surrounding structure from becoming damaged or forcibly removed from the frame 38 due to a pressure differential.

As will be described in greater detail as follows, the first and second portions 20, 22 and may be in the form of a latch and keeper or detent and receiver as well as a variety of other mechanical structures. It will also be appreciated by one of ordinary skill in the art, with the aid of this disclosure, that the portions 20, 22 could be in the form of electrical devices which operate mechanisms under the influence of electrical signals. In this regard, the pressure responsive device 26 could operate on an electrical signal in response to an electrical detection of pressure and variations. The signal would be received by a controller which would then operate a related electrical mechanism to move a mechanical device. Alternately, the electrical pressure detection signal could be used to operate an electro-magnet which would then provide the latching function between the first and second portions 20, 22. It should also be noted that the latching device 24 could be positioned at the hinge 50 to prevent movement of the door relative to the frame. However, it will be appreciated that the moment arm 70 created by a force 72 on the panel 40 relative to the hinge 50 may require stronger mechanisms to prevent overriding the latching device 24. With this in mind, it may be desirable to provide the latching device relative to the free-end 42 of the panel 40.

Figure 6:
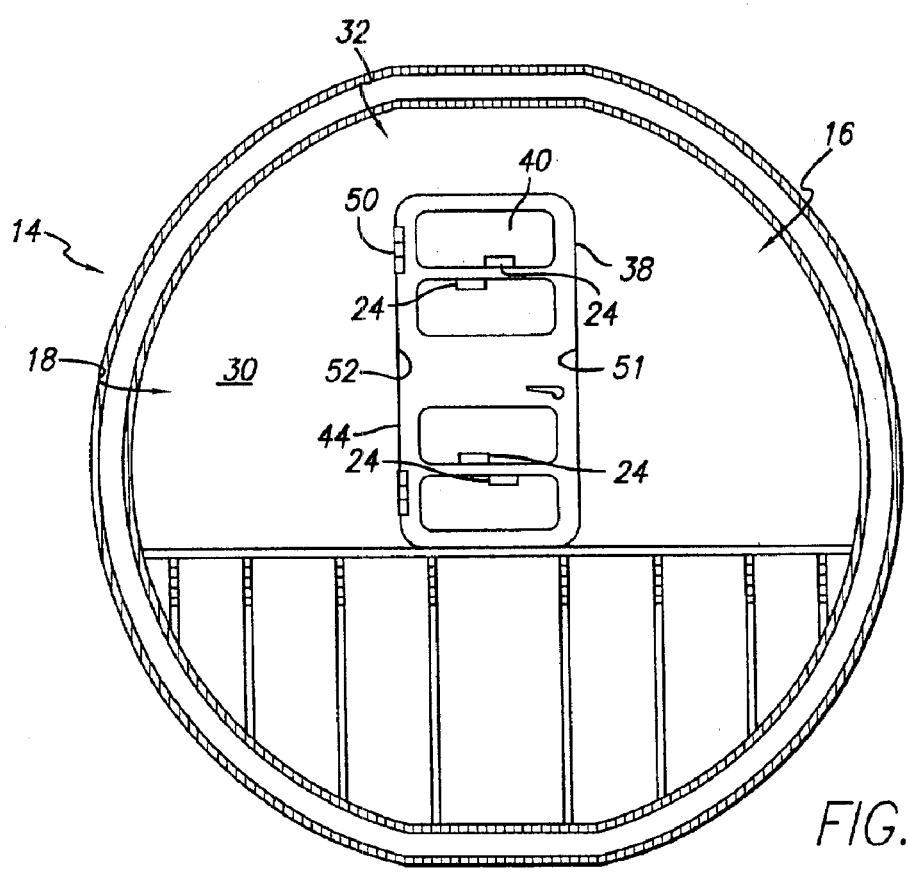
FIG. 6 is an alternate embodiment of the cross-section as generally shown in FIG. 2 in which multiple panels are used in a single frame structure including latching devices associated with the panels.

While it is envisioned that the latching device 24 with the pressure responsive device 26 may be used with a single panel covering a single opening, it is understood that some doors have multiple openings. In this regard, the latching device 24 as shown in FIG. 6 may be employed on each of such multiple panels as necessary. Additionally, the latching device 24 may be adjusted to allow venting of one panel at one pressure differential, a second panel at a second differential, and so on. This staged opening of the panels prevents opening of all the panels upon the development of a single pressure differential. In the event that the pressure differential is minor, one panel may be opened to provide the necessary level of equalization of the pressures. If the opening of a single panel is insufficient over a given period of time and the pressure differential is still maintained or if it increases, a second and subsequent panels may be opened in order to help equalize the pressures in a controlled manner. This staged opening of the panels 40 allows for more controlled pressure venting relative to the multiple panels.

Figure 7:
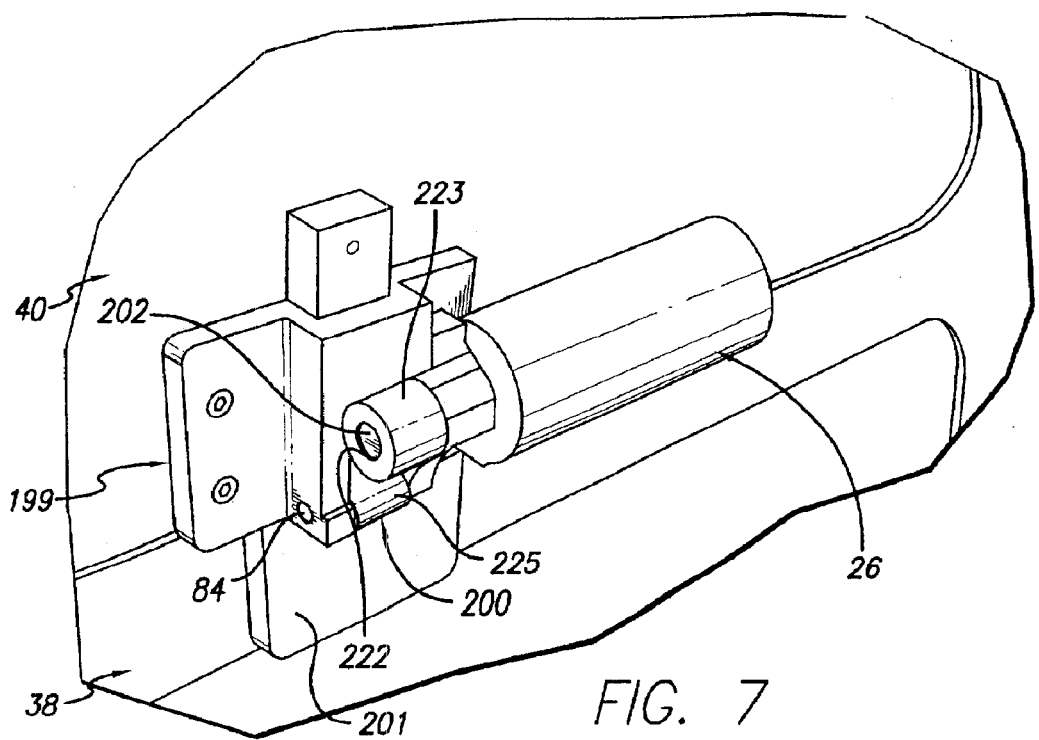
FIG. 7 is an enlarged view of a latching device as shown in FIG. 6.
Figure 8:
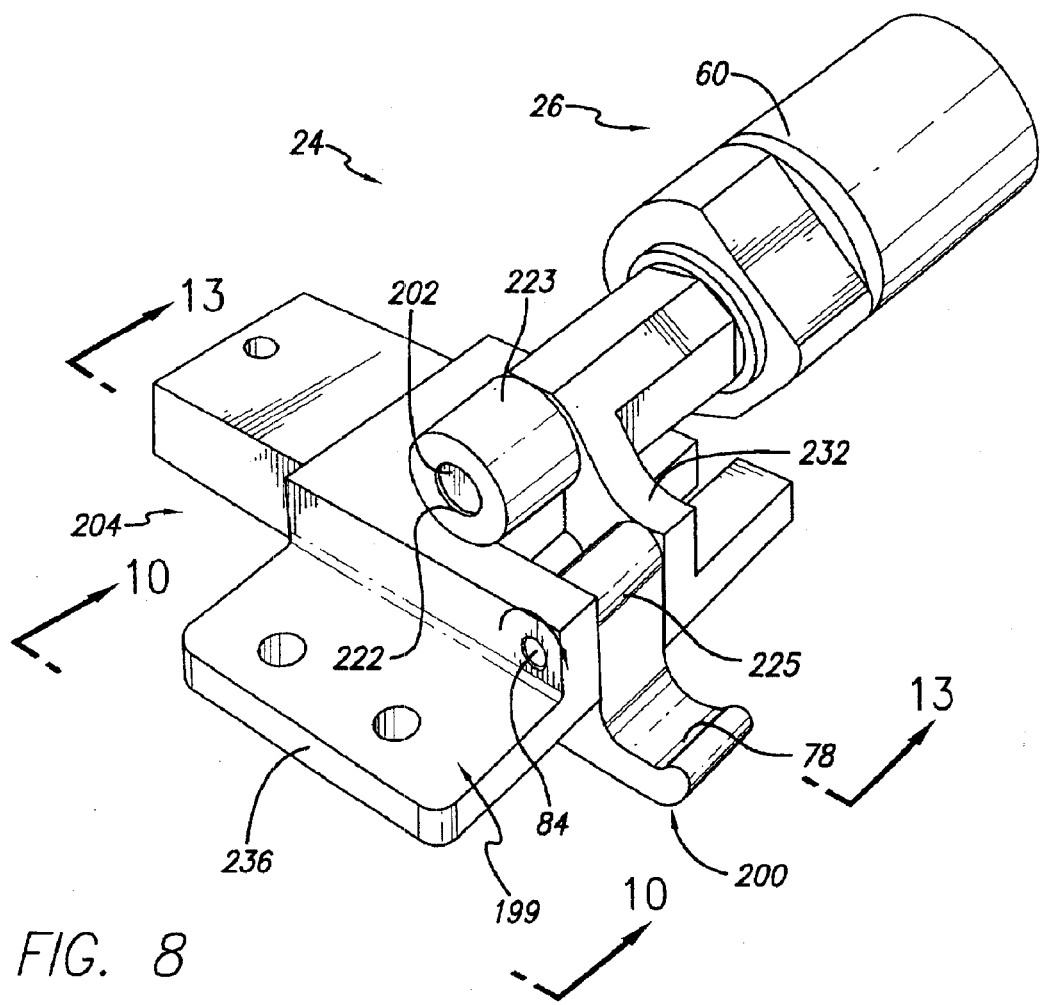
FIG. 8 is a perspective view of a latching device as disclosed.
Figure 9:
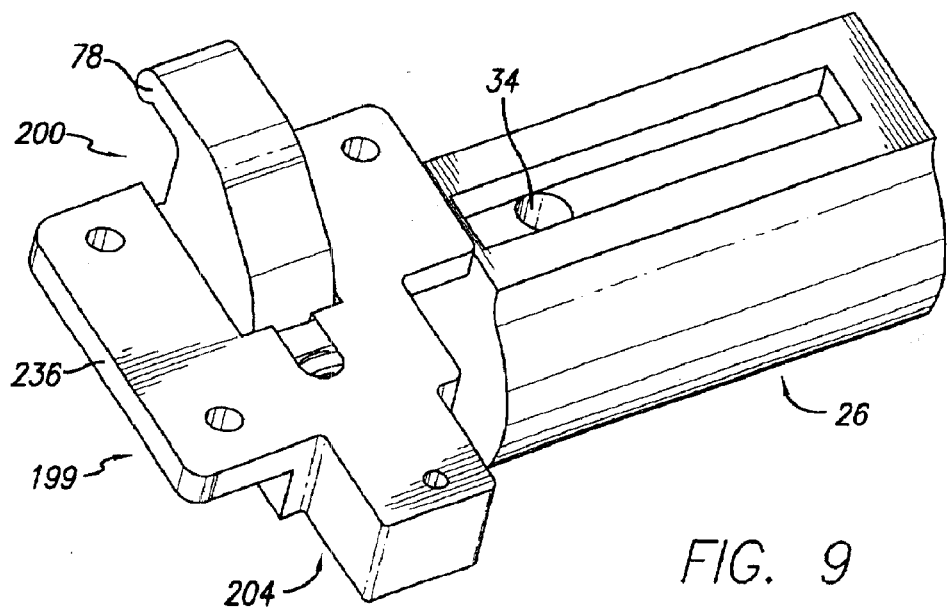
FIG. 9 is a rear view of the latching device as shown in FIG. 8.
Figure 10:
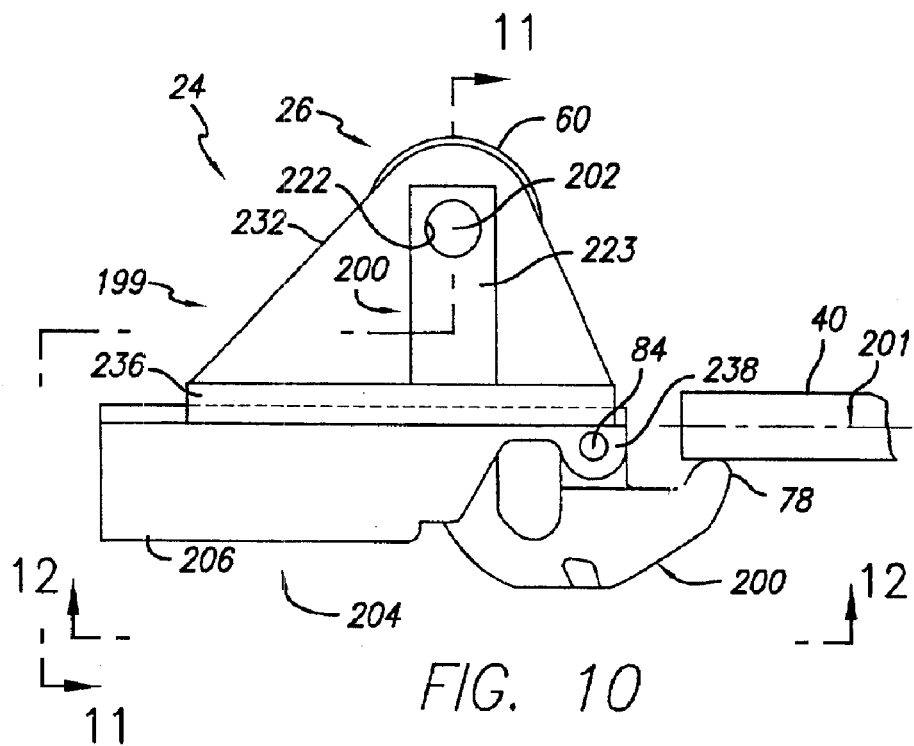
FIG. 10 is a side elevational view of the latching device taken along line 10—10 in FIG. 8.

Turning now to a specific embodiment of the present disclosure, the disclosure as shown in FIGS. 6–13 will be described. As shown in the figures the latching device 24 includes a latch body 199 with the pressure responsive device 26 carried thereon and a bolt 200 displaceably, generally rotatably, carried thereon. The latching device 24 can operate without the use of a separate keeper but typically includes a corresponding strike plate 201. The portion of the frame 38 or strike plate 201 define the second portion 22 in this embodiment. In this regard, a free-end 78 of the bolt 200 engages a corresponding portion of the panel 40 which it abuts. The bolt 200 is curved and rotates about pivot point 84. This latching device 24 as shown in FIG. 8 provides a latching function that resists unauthorized entry up to forces of approximately 2,000 lbs. but yet opens with low force, approximately 100 lbs. in the event of a pressure differential across the door. It will be appreciated by one of skill in the art that these levels of resistance and pressure differential can be set or otherwise selected depending on the application in which the latching device 24 is used.

With reference to FIGS. 6–13, multiple latching devices 24 are retained on panels 40 for resisting decompression forces towards the latching device 24. In other words, the latching device 24 is configured on the panel 40 to allow the panel to move inwardly towards the cockpit area 18. As shown in FIG. 7, the bolt 200 is retained by the pin 202 (FIGS. 8, 10–13) to resist inward movement of the panel 40. The latch body 199 is attached to the panel 40 by an appropriate fastening means such as screws or rivets. A striker or strike plate 201 is attached to the frame 38 to provide a contact surface for the bolt 200.

Figure 11:
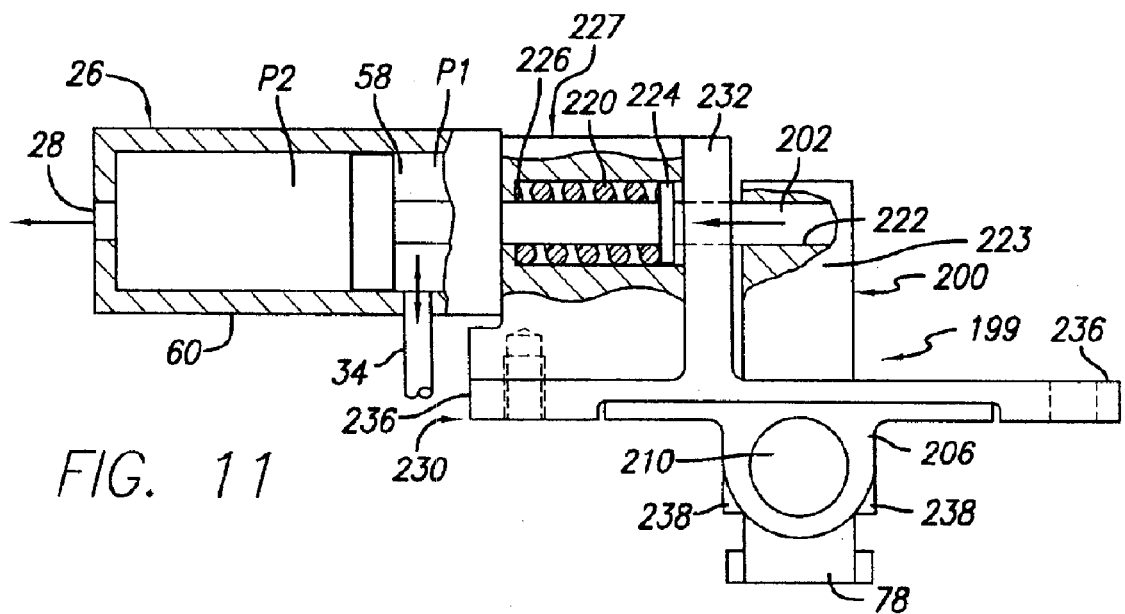
FIG. 11 is a plan view of the latching device taken along line 11—11 in FIG. 10 and in which a pressure responsive device is shown in partial fragmentary view.
Figure 12:
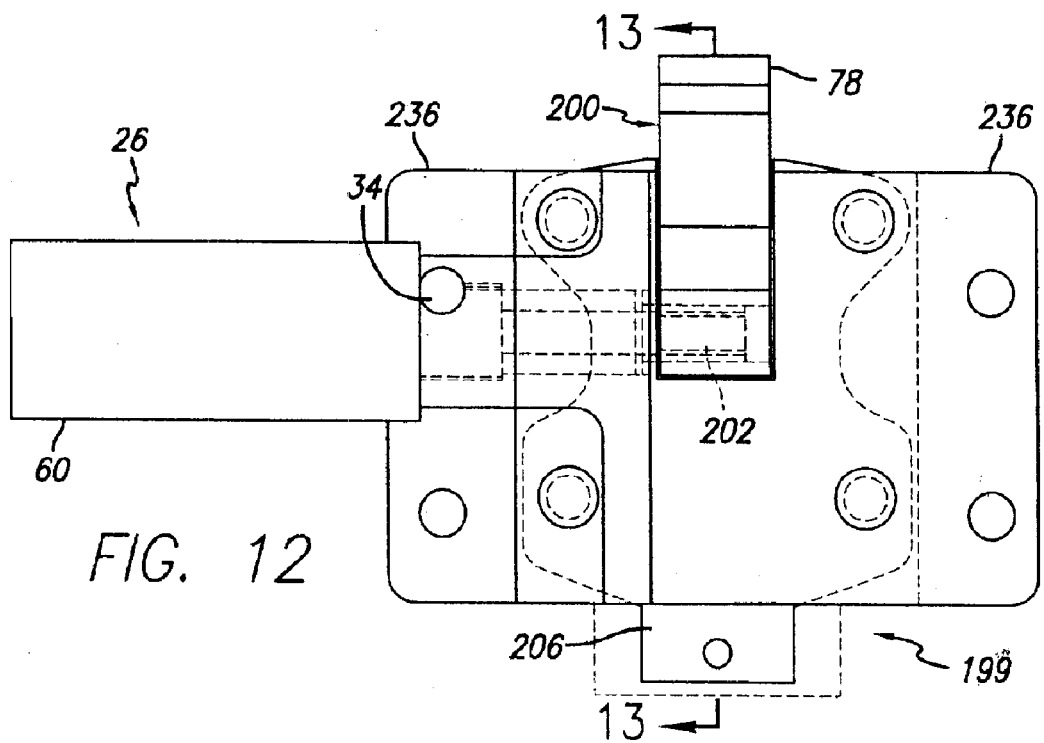
FIG. 12 is a top plan view of an embodiment of the latching device taken along line 12—12 in FIG. 10.

With reference to FIG. 11, pressure responsive device 26 includes the passage 34 communicating with the passenger compartment 19 and the passage 28 communicates with the cockpit 18. In this manner, the passage 34 communicates with the volume and resulting pressure of "P1", the passenger compartment 19, whereas the passage 28 communicates with the volume and pressure P2 of the cockpit area 18. Under ordinary circumstances where P1 is approximately equal to P2, the pressure responsive device 26 will not operate, move, or shift. As such, the pressure responsive device connected to a pin 202 will prevent disengagement of the bolt 200. Once the pressure differential causes disengagement of the bolt 200, a detent mechanism 204 (FIG. 13) will retain the bolt 200 in a desired position until the force of the detent mechanism 204 is overcome at loads less than 2000 lbs.

Further reference to FIG. 11, the pressure responsive device 26 includes the pin 202 which is attached to the plunger 58. Pin 202 extends through the bore 220 on the mounting knuckle 223 extending from the bolt 200. With the pin 202 engaged in the knuckle 223, the bolt 200 resists disengagement from the striker 201. When the pin 202 is withdrawn from the knuckle 223, the bolt 200 is allowed to rotate about the pivot pin 84 as indicated by the rotational arrows. The rotational portion 225 of the bolt engaged with the pivot pin 84 allows for rotation of the knuckle 223 and tip 78 about the pivot pin 84. As will be described below, a detent mechanism 204 is carried on the latch body 199 to provide resistance against disengagement.

Figure 13:
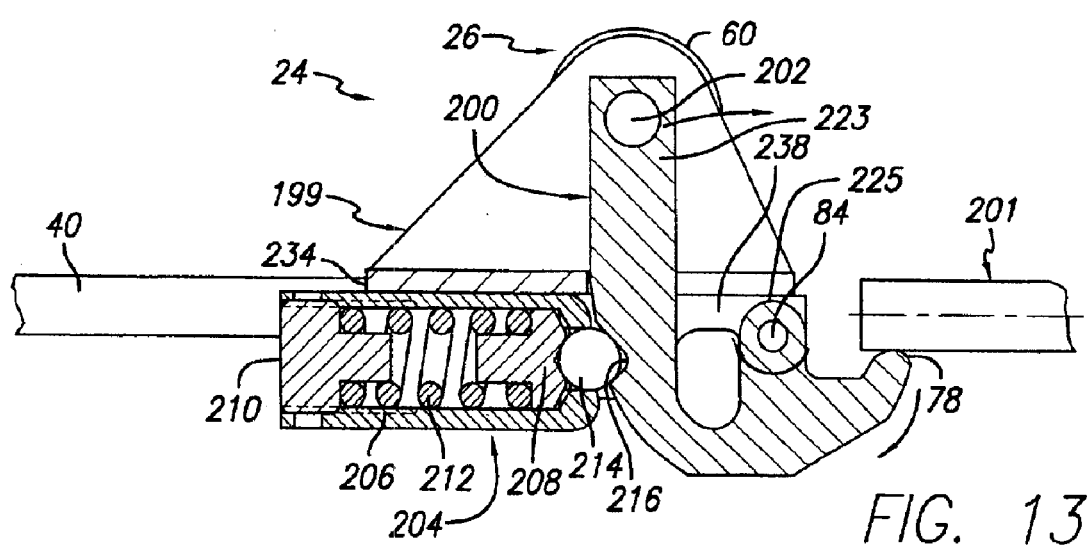
FIG. 13 is a partial fragmentary cross-sectional view taken along line 13—13 in FIG. 8.

With reference to FIG. 13, the detent 204 mechanism includes a housing 206 which contains a contact portion 208, a holding portion 210, a spring 212 and a roller 214. The roller 214 is retained against a notch 216 and the contact portion 208. The spring 212 retains the contact portion 208 against the roller 214. When the bolt 200 is released to rotate about pivot pin 84, the spring force against the roller 214 retained in the notch 216 must be overcome. As such, the force imposed on the panel 40 and transferred to the bolt 200 must exceed the force of the detent assembly 204 against the bolt 200. It should be noted that the spring force of the spring 212 against the contact portion 208 can be adjusted by movement of the retaining portion 210. The retaining portion 210 is threaded and engaged on the corresponding threaded interior of the housing 206 thereby allowing controlled generally axial movement through the housing 206 to controllably compress or release the spring 212 to increase or decrease the spring force, respectively, on the roller 214.

The latch body 199 includes an upstanding portion 232. The pressure responsive device 26 is attached to the latch body 199 and the upstanding portion 232. The pin 202 extends through the upstanding portion 232 to engage the passage 220 of the knuckle 223. The detent 204 is also carried on the latch body 199. As noted, the pivot pin 84 extends through a portion of the latch body 199 providing a point of rotation for the bolt 200. Mounting flanges 236 are provided on the latch body 199 mounting the device 24 to a corresponding structure. As such, the device 24 is a single unit package which can be attached to structures. Additionally, the device 24 can be retrofitted to structures and installed as a single package attachment to the appropriate structures.

In use, the latching device 24 as disclosed herein is attached to either a panel 40 or frame 38 to resist disengagement of the panel 40 relative to the frame 38. The latch body 199 is attached to the respective portion (panel 40 or frame 38) with the end 78 of the bolt 200 extending to the other portion (frame 38 or panel 40, respectively) to contact the corresponding striker plate 201. During ordinary use in which forces are not imposed upon the panel 40 the pressures P1, P2 in the passenger compartment 19 and cockpit 18, respectively, is generally equal and no pressure differential exists. As such, the pin 202 is engaged with the knuckle 223 to resist loads greatly in excess of that which might normally be imposed on the panel 40. With the pin 202 engaged in the knuckle 223 of the bolt, the panel is secure against disengagement from the frame 38.

Under a predetermined range or set of pressure differentials between P1 and P2, the pin 202 will be disengaged or retracted from the knuckle 223. For example, when the pressure P1 is greater than the pressure P2 to some predetermined degree, the pressure responsive device 26 will be operated. In this regard, the increase in pressure P1 in the passenger compartment 19 results in an increase in the pressure P1 of the portion of the chamber of the pressure responsive device 26 communicating via passage 34 with the passenger area 19. If the pressure P2 in the area communicating with the cockpit via passage 28 not equal to P1, the greater pressure of P1 will cause the piston to shift within the cylinder 60. Shifting of the piston 58 in the cylinder 60 will cause the pin 202 to withdraw from the knuckle 223.

It should be noted that a safety device or dampening device 227 including a biasing device such as a spring 220 is provided to provide a spring force retaining the pin 202 in engagement with the knuckle 223 of the bolt 200. The dampening device 227 includes a flange 224 abutting the spring 220 and an interior surface of the cavity 226 in which it is retained. This spring 220 and corresponding spring force is selected so as to provide a desired level of resistance force to prevent disengagement of the pin under intermittent changes in pressure which are not sustained. The spring 220 and associated components provide a dampening mechanism to provide a dampening system which prevents unintended disengagement on the pin, such as by an impact or shock load.

For example, if a differential occurs which would be suitable to cause disengagement of the pin occurs for an intermittent period of time, the dampening mechanism 227 provides a dampening effect on the system to prevent the disengagement. Additionally, if the pin is momentarily disengaged without the conditions being the desired type of conditions for complete disengagement, the bolt may be moved slightly preventing re-engagement of the pin. Unintentional disengagement of the pin 202 could result in compromising the security value of having the pin engaged with the bolt. As such, the dampening mechanism 227 prevents disengagement of the pin 202 when pressure differential aberrations occur.

When the pin 202 is disengaged from the knuckle 223, the detent mechanism 204 at least momentarily retains the bolt 200 in the desired position. A force is provided by the detent mechanism 204 by engagement of the roller 214 in the notch 216 of the bolt 200 to prevent unintended rotation and disengagement of the bolt 200. For example, under a condition in which the pressure differential is sufficiently sustained to cause the pin to disengage, ball detent mechanism 204 will continue to retain the bolt in the desired position as long as the forces do not exceed that exerted by the detent mechanism 204. However, if the forces which caused the initial disengagement of the pin 202 from the knuckle 223 are sustained sufficiently long with sufficient force, the forces imposed on the bolt 200 by the detent mechanism 204 will be overcome.

When the detent mechanism 204 is overcome, the bolt 200 is allowed to rotate about the pivot pin 84. Rotation of the bolt about the pivot pin 84 causes the end 78 of the bolt to disengage the corresponding portion of the striker 201 by allowing the panel 40 to rotate relative to the frame and become disengaged from the frame 38.

Once the pin 202 has been disengaged from the knuckle 223 and the detent 204 has been overcome, the latching device 24 can perform its function again after being manually reset. The resetting generally requires manual operation of positioning the panel in the desired location relative to the frame. Next, the 200 bolt must be rotated in the opposite direction of disengagement to reposition the end 78 of the bolt 200 against the striker plate 201. The bore 222 is then aligned so that the pin 202 can be extended through the bore to thereby engage the knuckle 223 of the bolt 200. The plunger 58 is driven by applying a force to the portion of the chamber associated with P2 by way of applying pressure through the passage 28. Applying increased pressure P2 through passage 28 causes the pin 202 to be driven into the knuckle 223 thereby re-engaging the latching device 24 for further use.

While embodiments of the disclosure are shown and described, it is envisioned that those skilled in the art may devise various modifications and equivalents without departing from the spirit and scope of the disclosure as recited in the following claims.

What is claimed is:

1. A latching device for displaceably retaining a panel relative to a frame, the latching device comprising:
   a latch body attachable to at least one of a panel and a frame;
   a bolt displaceably carried on the latch body;
   a portion of the bolt abutting a portion of the other of a panel and a frame for preventing displacement of a panel from a frame;
   a pressure responsive device for detecting a decrease in pressure on one side of a panel;
   a bolt engaging device coupled to the pressure responsive device and moveably displaceable in response to the pressure responsive device to mechanically couple to the bolt; and
   a receiving structure on the bolt for engaging at least a portion of the bolt engaging device to prevent displaceable movement of the bolt prior to operation of the pressure responsive device.

2. The latching device of claim 1, wherein the bolt is pivotably retained on the latch body.

3. The latching device of claim 1, wherein the pressure responsive device is carried on the latch body.

4. The latching device of claim 1, wherein the pressure responsive device includes means for detecting a first pressure and means for detecting a second pressure, the pressure responsive device operating in response to a differential between the first pressure and the second pressure.

5. The latching device of claim 1, wherein the pressure responsive device includes a pressure responsive diaphragm operatively retained in a pressure responsive chamber the chamber including a first opening communicating with a first volume and a second opening communicating with a second volume, a pressure differential between the first volume and second volume acting on the pressure responsive diaphragm in the chamber.

6. The latching device of claim 1, where in the pressure responsive device includes a pneumatic piston, operatively retained in a piston chamber, the chamber including a first opening communicating with a first volume and a second opening communicating with a second volume, a pressure differential between the first volume and second volume operating the piston in the chamber.

7. The latching device of claim 1, wherein the pressure responsive device includes an electrical pressure sensing device and a moving device coupled to the electrical pressure sensing device, the electrical pressure sensing device communicating with a first volume having a first pressure and a second volume having a second pressure.

8. The latching device of claim 1, further comprising a biased detent mechanism providing a biasing detent force on the bolt.

9. The latching device of claim 1, further comprising a dampening mechanism coupled with the pressure responsive device, the dampening mechanism preventing unintentional disengagement of the bolt engaging device.

10. The latching device of claim 9, the dampening mechanism including biasing means for providing a dampening effect on the displaceable movement of the bolt engaging device.

11. A latching device for displaceably retaining a panel relative to a frame, the latching device comprising:
    a latch body attachable to at least one of a panel and a frame;
    a bolt pivotably carried on the latch body;
    a portion of the bolt extending from the latch body for abutting a portion of the other of a panel and a frame to prevent displacement of a panel from a frame;
    a pressure responsive device responsive to a decrease in pressure on one side of a panel;
    a bolt engaging pin connected to the pressure responsive device, the bolt engaging pin being mechanically coupled to the bolt and moveably displaceable in response to the pressure responsive device; and
    a receiving structure on the bolt for engaging at least a portion of the bolt engaging pin to control displaceable movement of the bolt.

12. The latching device of claim 11, wherein the pressure responsive device includes means for detecting a first pressure and means for detecting a second pressure, the pressure responsive device operating in response to a differential between the first pressure and the second pressure.

13. The latching device of claim 11, wherein the pressure responsive device is carried on the latch body.

14. The latching device of claim 13, where in the pressure responsive device includes a pneumatic piston operatively retained in a piston chamber, the chamber including a first opening communicating with a first volume and a second opening communicating with a second volume, a pressure differential between the first volume and second volume operating the piston in the chamber.

15. The latching device of claim 11, where in the pressure responsive device includes a pressure responsive diaphragm operatively retained in a pressure responsive chamber, the chamber including a first opening communicating with a first volume and a second opening communicating with a second volume, a pressure differential between the first volume and second volume acting on the pressure responsive diaphragm in the chamber.

16. The latching device of claim 11, wherein the pressure responsive device includes an electrical pressure sensing device and a moving device coupled to the electrical pressure sensing device, the electrical pressure sensing device communicating with a first volume having a first pressure and a second volume having a second pressure.

17. The latching device of claim 11, further comprising a biased detent mechanism providing a biasing detent force on the bolt.

18. The latching device of claim 11, further comprising a dampening mechanism coupled with the pressure responsive device, the dampening mechanism preventing unintentional disengagement of the bolt engaging device.

19. The latching device of claim 18, the dampening mechanism including means for providing a dampening effect on the displaceable movement of the bolt engaging device.

20. A latching system for displaceably retaining a plurality of panels relative to a frame, the latching system comprising:
    at least one latching device operatively associated with each of the plurality of the panels, the latching device retaining the corresponding panel in position relative to the frame;
    a bolt displaceably carried on the latching device, the bolt being operatively associated with the corresponding panel;

each of the latching devices including at least one pressure responsive device operatively coupled to the corresponding bolt to selectively hold the bolt against movement; and the pressure responsive device responding to a decrease in pressure on one side of the panel and disengaging the bolt from the panel upon the development of a predetermined degree of pressure differential or pressure.

21. The latching device of claim 20, wherein the pressure responsive device is carried on the latch body.

22. The latching device of claim 20, wherein the pressure responsive device is separate from the latch body.

23. The latching device of claim 20, wherein the pressure responsive device includes a pressure responsive diaphragm, operatively retained in a pressure responsive chamber, the chamber including a first opening communicating with a first volume and a second opening communicating with a second volume, a pressure differential between the first volume and second volume acting on the pressure responsive diaphragm in the chamber.

24. The latching system of claim 20, wherein the pressure responsive device includes means for detecting a first pressure and means for detecting a second pressure, the pressure responsive device operating in response to a differential between the first pressure and the second pressure.

25. The latching device of claim 20, where in the pressure responsive device includes a pneumatic piston, operatively retained in a piston chamber, the chamber including a first opening communicating with a first volume and a second opening communicating with a second volume, a pressure differential between the first volume and second volume operating the piston in the chamber.

26. The latching system of claim 20, wherein the pressure responsive device includes an electrical pressure sensing device and a moving device coupled to the electrical pressure sensing device, the electrical pressure sensing device communicating with a first volume having a first pressure and a second volume having a second pressure.

27. The latching system of claim 20, further comprising a biased detent mechanism providing a biasing detent force on the bolt.

28. The latching system of claim 27, further comprising a dampening mechanism coupled with the pressure responsive device, the dampening mechanism preventing unintentional disengagement of the bolt engaging device.

29. The latching system of claim 28, the dampening mechanism including means for providing a dampening effect on the displaceable movement of the bolt engaging device.

30. The latching system of claim 27, wherein each pressure responsive device includes means for detecting a first pressure and means for detecting a second pressure, each pressure responsive device operating in response to a differential between the first pressure and the second pressure, the degree of pressure differential being different for each pressure responsive device.

31. A method for controllably latching a panel relative to a frame, the latching method being responsive to a pressure differential detected on two, generally opposite sides of a panel, the method comprising the steps of:

providing a latching device operatively associated with a panel;

providing a bolt displaceably carried on the latching device, the bolt being operatively associated with a panel;

providing a pressure responsive device operatively coupled to the bolt;

engaging the bolt with a panel;

retaining the bolt in engagement with a panel via a mechanical coupling device;

detecting pressure on at least one side of a panel;

operating the pressure responsive device in response to a decrease in pressure on one side of a panel;

releasing the bolt from the mechanical coupling device thereby disengaging the bolt from a panel upon development of a pressure differential of a predetermined degree or pressure; and displacing a panel relative to a frame upon disengagement of the bolt on a panel.

32. The method of claim 31, comprising a plurality of latching devices, each of the latching devices associated with a corresponding panel;

providing a pressure responsive device associated with each latching device;

providing each pressure responsive device set to respond at a predetermined pressure differential; and each of the predetermined pressure differentials associated with each of the pressure responsive devices being set at a different predetermined level.

33. A latching device for displaceably retaining a panel relative to a frame, the latching device comprising:

a latch body attachable to at least one of a panel and a frame;

a bolt displaceably carried on the latch body;

a portion of the bolt abutting a portion of the other of a panel and a frame for preventing displacement of a panel from a frame;

a pressure responsive device for detecting at least one of a pressure differential between two sides of a panel and a decrease in pressure on one side of a panel;

a bolt engaging device coupled to the pressure responsive device and moveably displaceable in response to the pressure responsive device;

a receiving structure on the bolt for engaging at least a portion of the bolt engaging device to prevent displaceable movement of the bolt prior to operation of the pressure responsive device; and the pressure responsive device including a pressure responsive diaphragm operatively retained in a pressure responsive chamber the chamber including a first opening communicating with a first volume and a second opening communicating with a second volume, a pressure differential between the first volume and second volume acting on the pressure responsive diaphragm in the chamber.

34. A latching device for displaceably retaining a panel relative to a frame, the latching device comprising:

a latch body attachable to at least one of a panel and a frame;

a bolt displaceably carried on the latch body;

a portion of the bolt abutting a portion of the other of a panel and a frame for preventing displacement of a panel from a frame;

a pressure responsive device for detecting at least one of a pressure differential between two sides of a panel and a decrease in pressure on one side of a panel;

a bolt engaging device coupled to the pressure responsive device and moveably displaceable in response to the pressure responsive device;

a receiving structure on the bolt for engaging at least a portion of the bolt engaging device to prevent displaceable movement of the bolt prior to operation of the pressure responsive device; and wherein the pressure responsive device includes an electrical pressure sensing device and a moving device coupled to the electrical pressure sensing device, the electrical pressure sensing device communicating with a first volume having a first pressure and a second volume having a second pressure.

35. A latching device for displaceably retaining a panel relative to a frame, the latching device comprising:

a latch body attachable to at least one of a panel and a frame;

a bolt pivotably carried on the latch body;

a portion of the bolt extending from the latch body for abutting a portion of the other of a panel and a frame to prevent displacement of a panel from a frame;

a pressure responsive device responsive to at least one of a pressure differential between two sides of a panel and a decrease in pressure on one side of a panel;

a bolt engaging pin connected to the pressure responsive device, the bolt engaging pin being moveably displaceable in response to the pressure responsive device;

a receiving structure on the bolt for engaging at least a portion of the bolt engaging pin to selectively prevent displaceable movement of the bolt; and the pressure responsive device including a pressure responsive diaphragm operatively retained in a pressure responsive chamber, the chamber including a first opening communicating with a first volume and a second opening communicating with a second volume, a pressure differential between the first volume and second volume acting on the pressure responsive diaphragm in the chamber.

36. A latching device for displaceably retaining a panel relative to a frame, the latching device comprising:

a latch body attachable to at least one of a panel and a frame;

a bolt pivotably carried on the latch body;

a portion of the bolt extending from the latch body for abutting a portion of the other of a panel and a frame to prevent displacement of a panel from a frame;

a pressure responsive device responsive to at least one of a pressure differential between two sides of a panel and a decrease in pressure on one side of a panel;

a bolt engaging pin connected to the pressure responsive device, the bolt engaging pin being moveably displaceable in response to the pressure responsive device;

a receiving structure on the bolt for engaging at least a portion of the bolt engaging pin to control displaceable movement of the bolt; and wherein the pressure responsive device includes an electrical pressure sensing device and a moving device coupled to the electrical pressure sensing device, the electrical pressure sensing device communicating with a first volume having a first pressure and a second volume having a second pressure.

37. A latching system for displaceably retaining a plurality of panels relative to a frame, the latching system comprising:

at least one latching device operatively associated with each of the plurality of the panels, the latching device retaining the corresponding panel in position relative to the frame;

a bolt displaceably carried on the latching device, the bolt being operatively associated with the corresponding panel;

each of the latching devices including at least one pressure responsive device operatively coupled to the corresponding bolt to selectively hold the bolt against movement;

the pressure responsive device responding to at least one of a pressure differential between two sides of the panel and a decrease in pressure on one side of the panel and disengaging the bolt from the panel upon the development of a predetermined degree of pressure differential or pressure; and the pressure responsive device including a pressure responsive diaphragm, operatively retained in a pressure responsive chamber, the chamber including a first opening communicating with a first volume and a second opening communicating with a second volume, a pressure differential between the first volume and second volume acting on the pressure responsive diaphragm in the chamber.

38. A latching device for displaceably retaining a panel relative to a frame, the latching device comprising:

a latch body attachable to at least one of a panel and a frame;

a bolt displaceably carried on the latch body;

a portion of the bolt abutting a portion of the other of a panel and a frame for preventing displacement of a panel from a frame;

a pressure responsive pressure cylinder for detecting at least one of a pressure differential between two sides of a panel and a decrease in pressure on one side of a panel;

a bolt engaging pin coupled to the pressure responsive pressure cylinder and moveably displaceable in response to the pressure responsive pressure cylinder; and a receiving structure on the bolt for engaging at least a portion of the bolt engaging pin to prevent displaceable movement of the bolt prior to operation of the pressure responsive pressure cylinder.

39. A latching device for displaceably retaining a panel relative to a frame, the latching device comprising:

a latch body attachable to at least one of a panel and a frame;

a bolt pivotably carried on the latch body;

a portion of the bolt extending from the latch body for abutting a portion of the other of a panel and a frame to prevent displacement of a panel from a frame;

a pressure responsive pressure cylinder having a pressure responsive piston responsive to at least one of a pressure differential between two sides of a panel and a decrease in pressure on one side of a panel;

a bolt engaging pin connected to the piston in the pressure responsive pressure cylinder, the bolt engaging pin being moveably displaceable in response to movement of the piston in the pressure responsive pressure cylinder; and a receiving structure on the bolt for engaging at least a portion of the bolt engaging pin to control displaceable movement of the bolt.

40. A method for controllably latching a panel relative to a frame, the latching method being responsive to a pressure differential detected on two, generally opposite sides of a panel, the method comprising the steps of:

providing a latching device operatively associated with a panel;

providing a bolt displaceably carried on the latching device, the bolt being operatively associated with a panel;

providing a pressure responsive pressure cylinder operatively coupled to the bolt;

providing a bolt engaging pin connected to the pressure responsive pressure cylinder;

engaging the bolt with a panel;

engaging the bolt engaging pin with the bolt;

retaining the bolt in engagement with a panel with the bolt engaging pin;

detecting pressure on at least one side of a panel;

operating the pressure responsive pressure cylinder in response to at least one of a pressure differential between two sides of a panel and a decrease in pressure on one side of a panel;

disengaging the pin from the bolt in response to operation of the pressure responsive pressure cylinder;

disengaging the bolt from a panel upon development of a pressure differential of a predetermined degree or pressure; and displacing a panel relative to a frame upon disengagement of the bolt on a panel.

* * * * *